United States Patent

Jones

[11] 4,026,001
[45] May 31, 1977

[54] SEAT EXTRACTOR TOOL FOR EXTRACTING VALVE SEATS

[75] Inventor: Thomas M. Jones, Houston, Tex.

[73] Assignee: ACF Industries, Incorporated, New York, N.Y.

[22] Filed: Dec. 31, 1975

[21] Appl. No.: 645,859

[52] U.S. Cl. .............................. 29/213 E; 29/252; 29/427

[51] Int. Cl.² ......................................... B23P 19/04

[58] Field of Search ................ 29/427, 426, 213 E, 29/213 R, 239, 244, 252, 270, 282, 283, 234, 235

[56] References Cited

UNITED STATES PATENTS

| | | | |
|---|---|---|---|
| 2,348,293 | 5/1944 | Hamer | 29/252 X |
| 2,671,262 | 3/1952 | Kuniholm | 29/252 X |
| 2,832,653 | 4/1958 | Wilson | 29/252 UX |
| 2,946,610 | 7/1960 | Jenness | 29/252 X |
| 3,267,568 | 8/1966 | Johnson et al. | 29/213 R |

Primary Examiner—James R. Duzan
Attorney, Agent, or Firm—Eugene N. Riddle

[57] ABSTRACT

A tool for extracting press-fitted seats from annular seat recesses of a gate valve body by insertion within the flow passage from the valve chamber. The tool is generally cylindrical in shape and has a pair of spaced end caps secured to each other with a pair of spaced elastomeric annular seals between the end caps and seal retainers on each side of the elastomeric seals. Pressurized hydraulic fluid is inserted in the tool to urge the elastomeric seals outwardly; one seal being in fluid sealing contact with the seat to be removed and the other seal being in fluid sealing contact with the adjacent flow passage surface. An increase in the fluid pressure of the hydraulic fluid effects a flow of fluid in the recess behind the seat to move the seat out of its recess.

3 Claims, 6 Drawing Figures

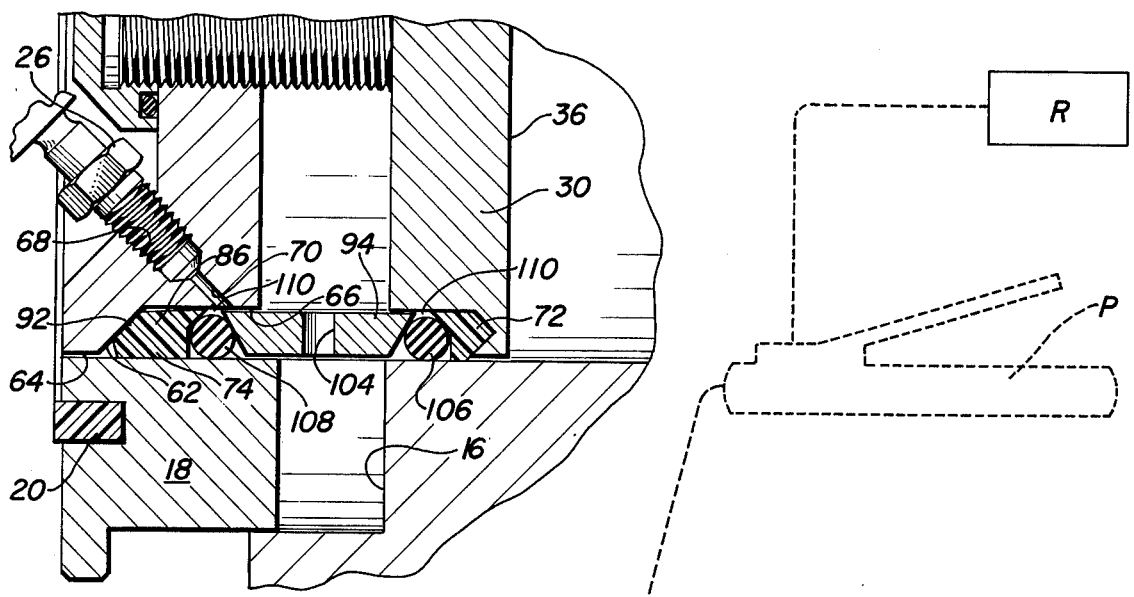
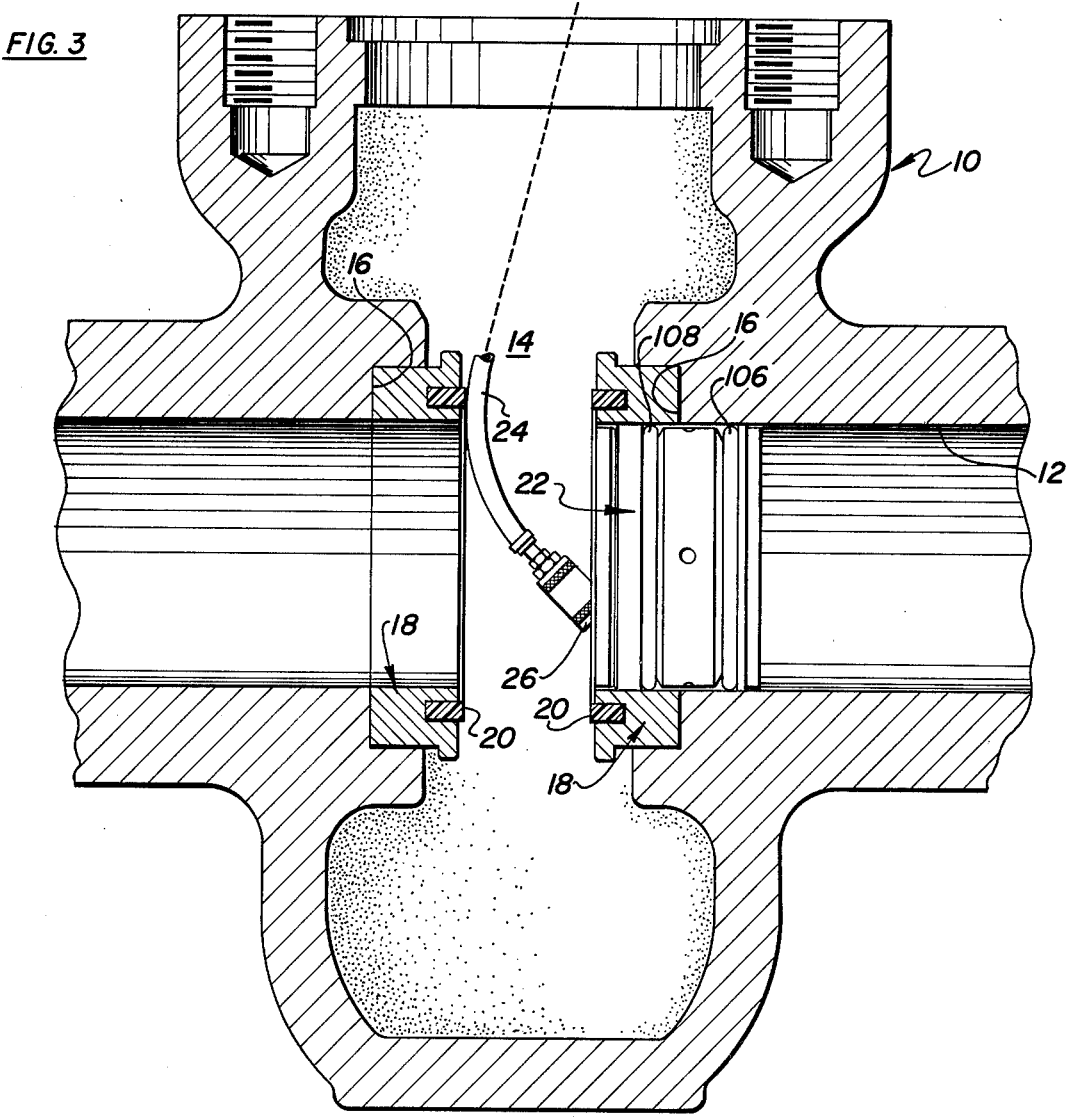
FIG. 3
FIG. 1

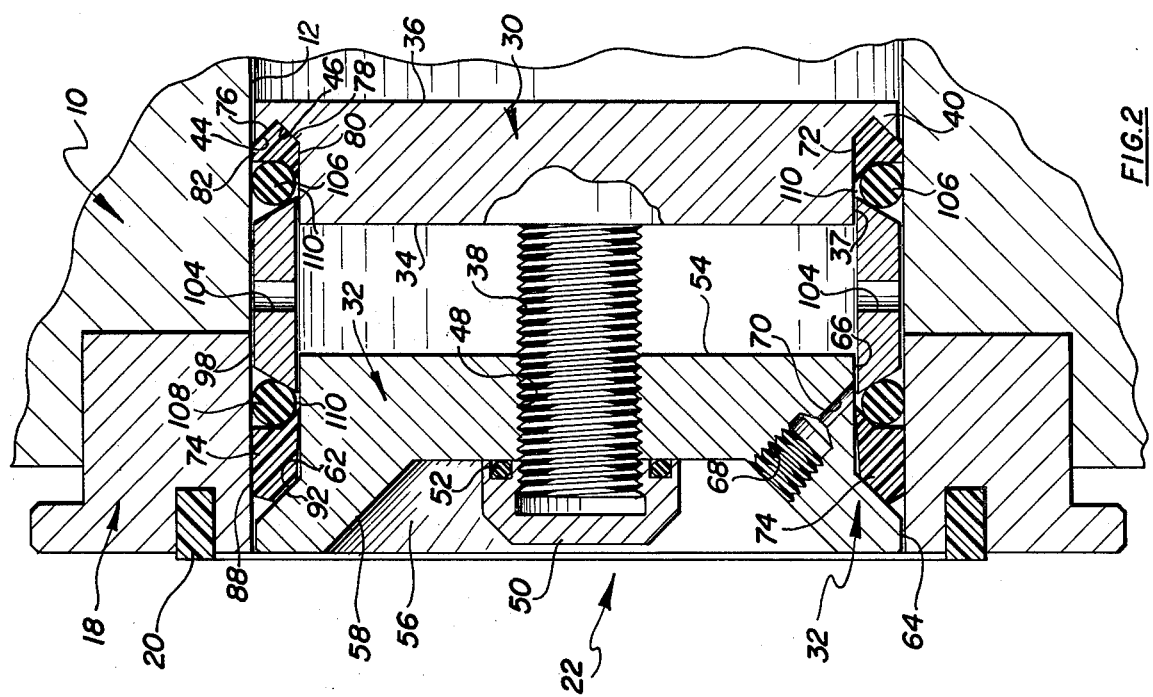
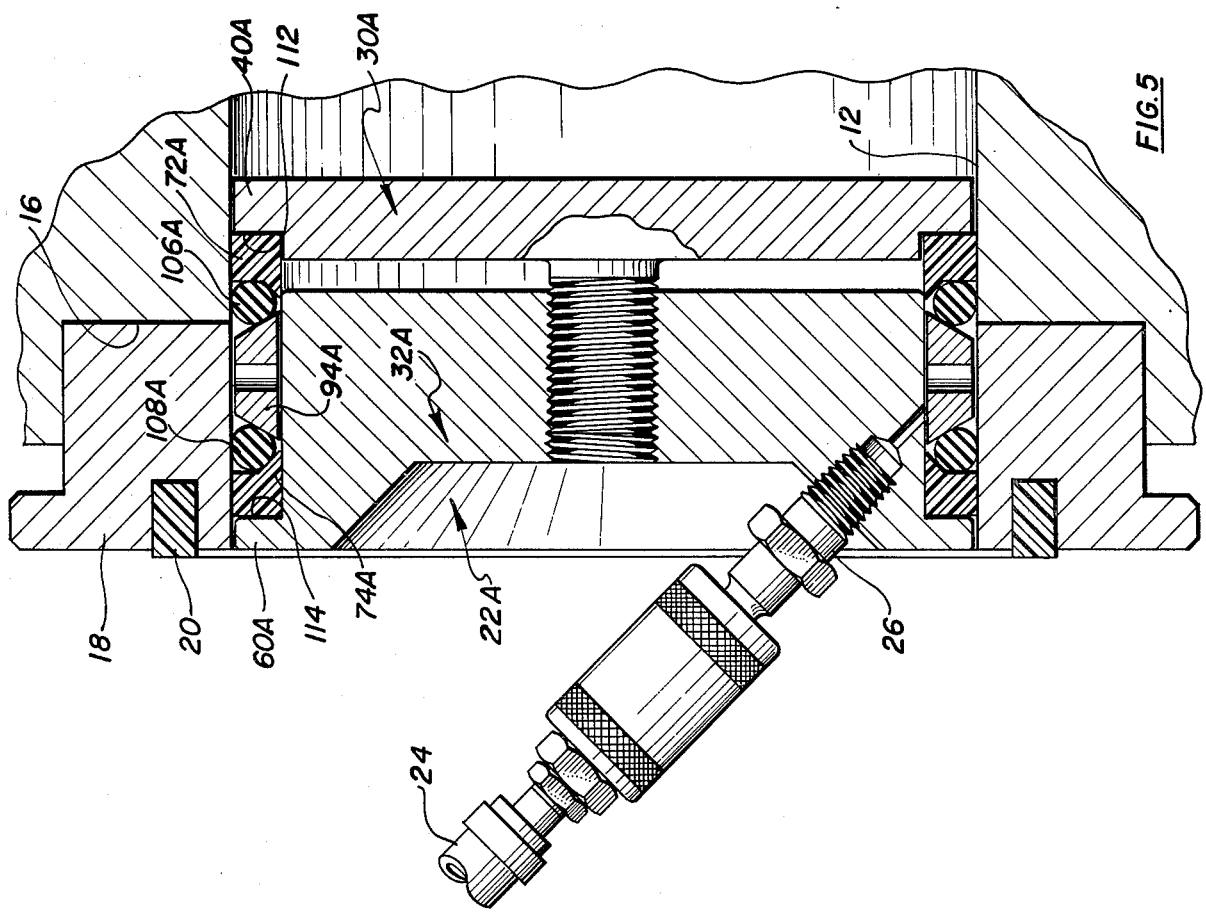

SEAT EXTRACTOR TOOL FOR EXTRACTING VALVE SEATS

BACKGROUND OF THE INVENTION

The invention relates generally to the servicing of valves and specifically to a tool and method for the extraction of press-fitted seats from the seat recesses of a valve.

Heretofore, tools have been employed to remove valve seats from recesses in a flowline. However, such tools have normally employed means to grip or bite into the seats with a force being applied to the gripping means to remove the valve seat from the recess. The tools have been operated heretofore both manually and by pressurized fluid.

Particularly after valves have been employed in service with corrosive fluids in the flow passages, the seats become firmly positioned in recesses and are difficult to dislodge. The gripping means heretofore have normally employed teeth or some other means which are imbedded in the seats for removal of the seats and at times when the seats are tightly fitted in the recesses, the teeth will gouge or shear off the metal adjacent the imbedded area and thereby be removed from engagement with the seats. The teeth then have to be reengaged with the seats for removal.

An example of an extraction tool employing gripping means to engage an annular seat is illustrated in U.S. Pat. No. 3,296,687 dated Jan. 10, 1967 and shows teeth which imbed themselves in the seat and then fluid pressure is employed to urge the teeth outwardly for pulling the seat from the recess. As noted above, particularly when the seat is firmly embedded in the recess which might occur after prolonged use with corrosive fluids in the flow passage, the teeth will somtimes slip off the seat before the seat is dislodged from the recess. This sometimes necessitates several attempts in engaging the teeth with the seat before the seat is removed.

BRIEF DESCRIPTION OF THE INVENTION

The seat extraction tool and method comprising the present invention does not employ any means to grip the seat for removal of the seat. The tool and method uses pressurized hydraulic fluid which flows or seeps behind the seat ring and acts against the entire back surface of the seat ring to urge or move the seat ring from the recess. Hydraulic fluid may be pressurized to a pressure in excess of 10,000 psi before the seat is removed and the tight press-fit of the seat within the recess is initially broken. The tool comprises a generally cylindrical body structure having a pair of spaced end caps which are secured to each other, and a pair of spaced annular elastomeric seals positioned between the end caps between seal retainers. The tool is positioned within the flow passage with one elastomeric seal adjacent the seat to be extracted and the other elastomeric seal within the flow passage spaced longitudinally of the first seal. Pressurized hydraulic fluid is supplied to the tool between the end caps and urges the annular elastomeric seals outwardly into fluid sealing relation with the conduit forming the flow passage and the seat. When the hydraulic fluid is pressurized a sufficient amount, the hydraulic fluid flows or seeps behind the seat ring and at an adequate pressure the seat will be broken from its press-fit within the recess and slowly urged out of the recess by the fluid. Once the seat has been initially broken loose from its recess, the hydraulic fluid pressure is reduced and the seat extracted easily.

DESCRIPTION OF THE DRAWINGS

FIG. 1 is a sectional view of a gate valve structure having the tool comprising one embodiment of the present invention within the flow conduit and in position for the removal of a seat from a recess in a valve;

FIG. 2 is an enlarged fragment of FIG. 1 showing the embodiment of the tool in FIG. 1 mounted within the flow passage for movement with the adjacent seat as the seat is removed from the recess;

FIG. 3 is an enlarged sectional view of a portion of the extractor tool similar to FIG. 2 but showing the valve seat after it has been dislodged and has moved outwardly with the extractor tool;

FIG. 5 is an enlarged sectional view of another embodiment of the present invention in which the extractor tool does not move with the valve seat as the valve seat is urged outwardly from the recess.

Figure 4:
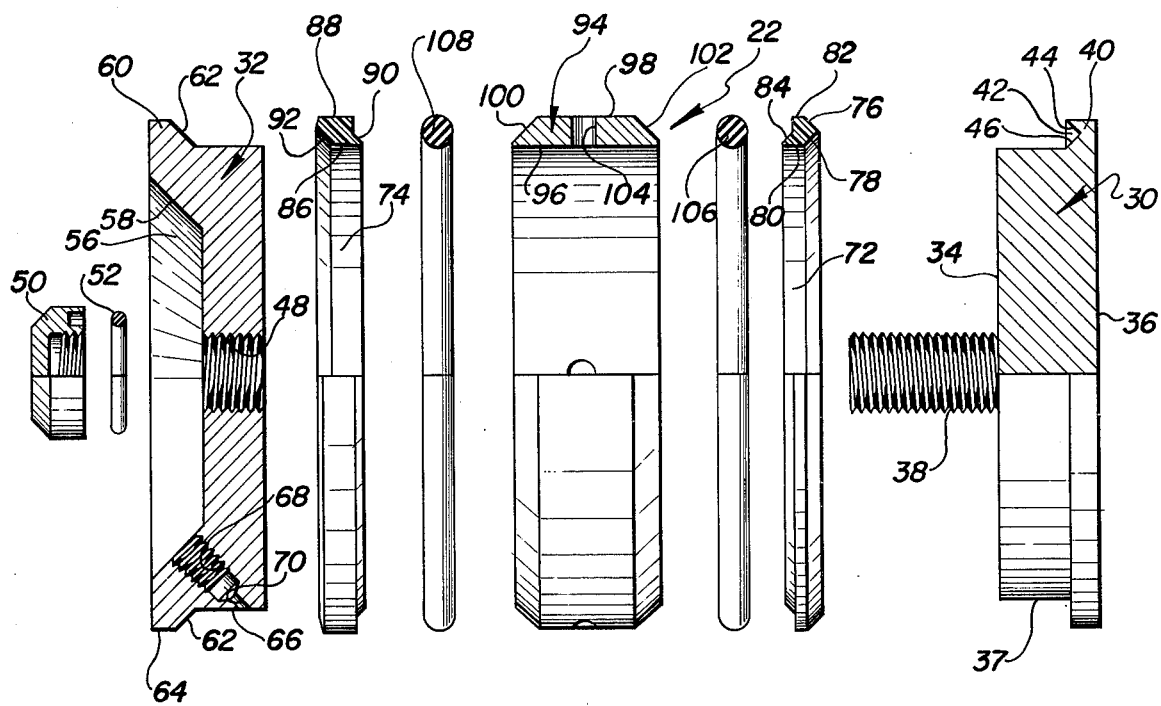
FIG. 4 is an exploded view of the extractor tool of FIGS. 1 – 3 removed from the valve.

Referring now to the drawings for a better understanding of this invention and more particularly to the embodiment shown in FIGS. 1 – 4, a gate valve body is shown generally at 10 in FIG. 1 and has a conduit forming a flow passage 12 extending therethrough. Valve body 10 includes a valve chamber 14 and annular recesses 16 are formed in valve body 10 adjacent valve chamber 14. Press-fitted within each recess 16 is an annular valve seat or seat ring indicated generally at 18 and having a resilient sealing element 20 fitting tightly within a groove in seat 18 and adapted to engage the face of a gate valve element (not shown). The bonnet has been removed from the valve structure of gate valve body 10 shown in FIG. 1 and a seat extractor tool indicated generally at 22 and comprising one embodiment of the present invention has been inserted within flow passage 12 adjacent one seat 18. A hydraulic fluid line 24 has a fitting 26 connected to extractor tool 22 and a hand pump P supplies hydraulic fluid from a suitable fluid reservoir R through line 24 to extractor tool 22 for removal of seat 18.

Seat extractor tool 22 is generally cylindrical in shape and has a pair of end caps 30 and 32 connected to each other in a spaced relation. End cap 30 has an inner planar surface 34, an outer planar surface 36, and a peripheral surface 37. A threaded stud 38 extends from inner surface 34. An annular flange 40 about end cap 30 has a generally V-shaped notch 42 along its inner surface which defines inclined surfaces 44 and 46 forming at their juncture the apex of V-shaped notch 42. End cap 32 has an internally threaded central opening 48 which receives externally threaded stud 38 in threaded relation. To hold end cap members 30 and 32 in spaced relation to firmly secure stud 38, a nut 50 is threaded onto the end of stud 38 and an annular seal 52 on nut 50 provides a fluid tight connection. End cap 32 has an inner surface 54 and a recess 56 is provided in its outer surface to provide a spaced for end nut 50 as shown in FIG. 2. Recess 56 is defined by end surface 58. An annular flange 60 on end cap 32 forms a rim about outer surface 58 and has an inclined inner surface 62 which connects outer peripheral surface 64 of flange 60 and outer peripheral surface 66 of end cap 32. Hydraulic fluid line fitting 26 is externally threaded and fits within internally threaded opening 68 in end cap 32. A port 70 in peripheral surface 66 is in fluid communication with threaded opening 68 to provide a passage for hydraulic fluid from hand pump P to a location between end caps 30 and 32.

Outer seal retainers 72 and 74 are positioned adjacent respective end cap 30 and end cap 32. Retainers 72 and 74 are resilient and formed preferably of Teflon. Outer seal retainer 72 fits within notch 42 of end cap 30 and is retained tightly therein. Retainer 72 comprises V-shaped surfaces 76 and 78 which generally mate with surfaces 44 and 46 forming notch 42. Retainer 72 has an inner circumferential surface 80 and an outer circumferential surface 82. An inner flange or extension 84, generally triangular in cross section, extends from inner circumferential surface 80 and forms a continuation of inner surface 80 along one side of flange 84.

Outer seal retainer 74 has an inner circumferential surface 86 and an outer circumferential surface 88. An inner flange 90 generally triangular in cross section extends inwardly from retainer 74. An outer inclined or cam surface 92 mates with inclined surface 62 on end cap 32 and is adapted to slide along inclined surface 62 upon the application of hydraulic fluid pressure. Inner circumferential surface 86 is slightly inclined with respect to the adjacent peripheral surface 66 on end cap 32 which aids surface 92 in sliding along surface 62. Outer circumferential surface 88 is a relatively wide surface and provides a frictional contact surface with the adjacent seat 18 when in operation so that tool 22 will move with seat 18 upon the removal thereof when hydraulic fluid pressure is applied as will be explained. An inner seal retainer indicated generally at 94 has a trapezoidal cross section with an inner circumference 96, an outer circumference 98, and sides 100 and 102 inclined inwardly from inner circumference 96. The outer diameter of inner seal retainer 94 is substantially the same as the outer diameters formed by flanges 40 and 60 of respective end caps 30 and 32. The outer diameters of outer seal retainers 72 and 74 are slightly greater than the outer diameters of flanges 40, 60 and inner seal retainer 94. A plurality of openings 104 are provided about the circumference of inner retainer 94 to provide a fluid passageway through inner retainer 94.

Elastomeric O-rings indicated at 106 and 108 are positioned between inner seal retainer 94 and outer seal retainers 72 and 74 spaced from inner seal retainer 94 to form openings 110 therebetween. O-rings 106 and 108 have outer diameters in a relaxed condition generally the same as the outer diameters of outer seal retainers 72 and 74 and are seated on respective inner flanges 84 and 90 of retainers 72 and 74. O-rings 106 and 108 upon the application of pressurized hydraulic fluid are urged outwardly to provide a fluid tight sealing engagement with the adjacent surfaces.

OPERATION

In operation, with the bonnet of gate valve body removed as shown in FIG. 1, extractor tool 22 is inserted within the flow passage 12. O-ring 106 is positioned adjacent the inner surface of the conduit defining flow passage 12 and sufficiently rearward of recess 13 so that tool 22 may move with seat 18 until removed from recess 16 while O-ring 106 maintains a fluid tight sealing relation with the adjacent surface defining flow passage 12. O-ring 108 is positioned adjacent seat ring 18 as shown in FIG. 2. In this position, hydraulic fluid may be pumped by hand pump P through line 24 to tool extractor 22. As the hydraulic fluid flows and is pressurized between end caps 30 and 32, the fluid flows through the spacing forming opening 110 between inner seal retainer 94 and the outer seal retainers 72 and 74 thereby to urge O-rings 106 and 108 outwardly into tight sealing relation with the adjacent surfaces. O-ring 106 is also urged against end seal retainer 72 and seal retainer 72 is firmly positioned within notch 42 formed in end cap 30 and thus, retainer 72 is not urged outwardly into engagement with the adjacent surface defined by flow passage 12 as surface 44 forming V-shaped notch 42 restrains any outward movement of seal retainer 72. However, O-ring 108 is urged against outer seal retainer 74 and urges seal retainer 74 outwardly against seat 18 as surface 92 of seal retainer 74 slides along inclined surface 62. Upon being urged outwardly surface 88 moves into tight frictional contact with the adjacent surface of seat 18. The outward movement of seal retainer 74 is aided by the slight inclination of inner circumferential surface 86. Upon an increased build-up of pressure from the hydraulic fluid, fluid flows through openings 104 and between the space between the outer surface 98 of inner retainer 94 and flow passage 10 to seep behind seat 18 and thereby urge seat 18 outwardly. The hydraulic fluid pressure necessary to dislodge seat 18 initially will depend on the tightness of seat 18 within recess 16 and may, under certain conditions, be as high as 10,000 psi. After seat 18 has been initially broken loose, the hydraulic fluid pressure will be decreased and tool 22 will move with seat 18 through frictional contact surface 88 on seal retainer 74 and seat 18. O-ring seal 106 slides along the adjacent surface defining flow passage 10 as seat 18 moves outwardly and maintains a fluid tight sealing relation during the outward movement of seat 18.

Outer seal retainer 74 also tends to urge seat 18 outwardly as O-ring 108 acting against retainer 74 urges retainer 74 along surface 62 which results in an outward movement of retainer 74 along with seat 18. After seat ring 18 has been initially broken from recess 16, the fluid pressure is gradually reduced for urging seat 18 completely out of its recess. Thus, the highest fluid pressure is normally required for the initial breaking loose of seat 18 and hydraulic fluid pressure as high as around 10,000 psi may be employed.

Figure 6:
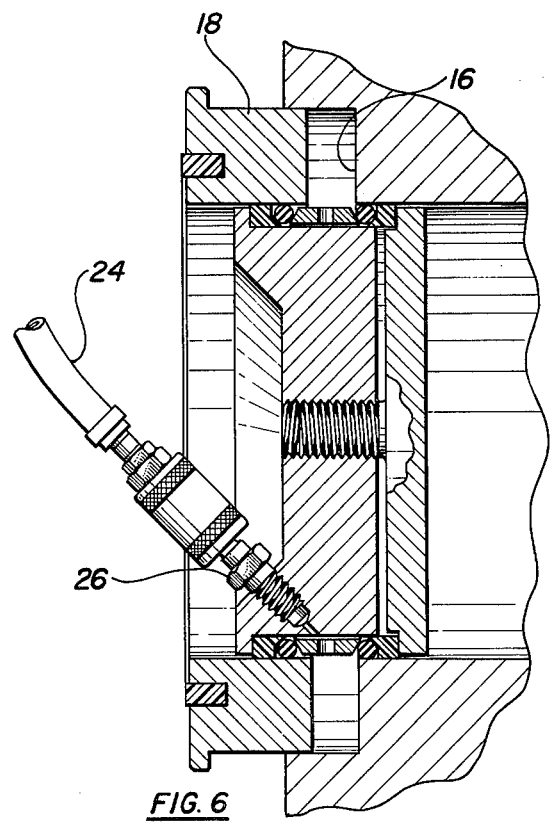
FIG. 6 is a sectional view of a portion of the embodiment of the extractor tool shown in FIG. 5 with the seat moved outwardly from the recess relative to the extractor tool.

Referring to FIGS. 5 and 6, a separate embodiment of the extraction tool is illustrated at 22A. Tool 22A is constructed so that it moves outwardly with seat 18. Tool 22A includes outer seal retainers 72A and 74A. End cap 30A has a flange 40A with a flat inner surface 112. End cap 32A has a flange 60A with a flat inner surface 114. Outer seal retains 72A and 74A fit against the flat surfaces 112 and 114. Thus, upon the application of hydraulic fluid pressure, O-rings 106A and 108A urge seal retainers 72A and 74A against respective surfaces 112 and 114 and no substantial frictional contact is provided between seal retainer 74A and seat 18. Inner seal retainer 94A is trapezoidal in cross section. In operation, tool 22A is positioned within flow passage 12 so that O-ring 106A is positioned closely adjacent recess 16 with O-ring 108A spaced substantially from recess 16 so that seat 18 may move relative to O-ring 108A and yet O-ring 108A will maintain fluid tight sealing contact with seat 18 during the entire removal of seat 18. Extractor tool 22A functions in the same manner as extraction tool 22 except that tool 22A is arranged as described above so that it does not move with seat 18 when seat 18 is moved out of recess 16 by hydraulic fluid pressure.

What is claimed is:

1. A tool for extracting press-fitted seats from annular seat recesses of a valve body having flow passages, comprising a generally cylindrical body structure having a pair of spaced end caps adapted to fit within a flow passage, said end caps each having an outer peripheral surface and a flange extending outwardly from the adjacent peripheral surface, means adjustably connecting the spaced end caps for longitudinal movement relative to each other, an annular retainer positioned about the body structure between the flanges of the end caps and freely movable relative to the end caps, an annular elastomeric seal between the flange of each end cap and the retainer, said elastomeric seals being urged radially outwardly by said retainer upon the longitudinal movement of said end caps toward each other, fluid passage means extending from a position outwardly of the tool to a position between the elastomeric seals to provide fluid communication to the seals, and means to supply a pressurized liquid fluid through the fluid passage means to urge the elastomeric seals radially outwardly into fluid-tight sealing engagement with the adjacent surface defining the associated flow passage.

2. A tool for extracting press-fitted seats as set forth in claim 1 wherein said retainer is a substantially rigid ring having a flow passage therethrough for said pressurized liquid fluid.

3. A tool for extracting press-fitted seats as set forth in claim 2 wherein said rigid ring has opposed surfaces in contact with the elastomeric seals to urge the elastomeric seals outwardly when the end caps are moved together.

* * * * *